Figure 1:
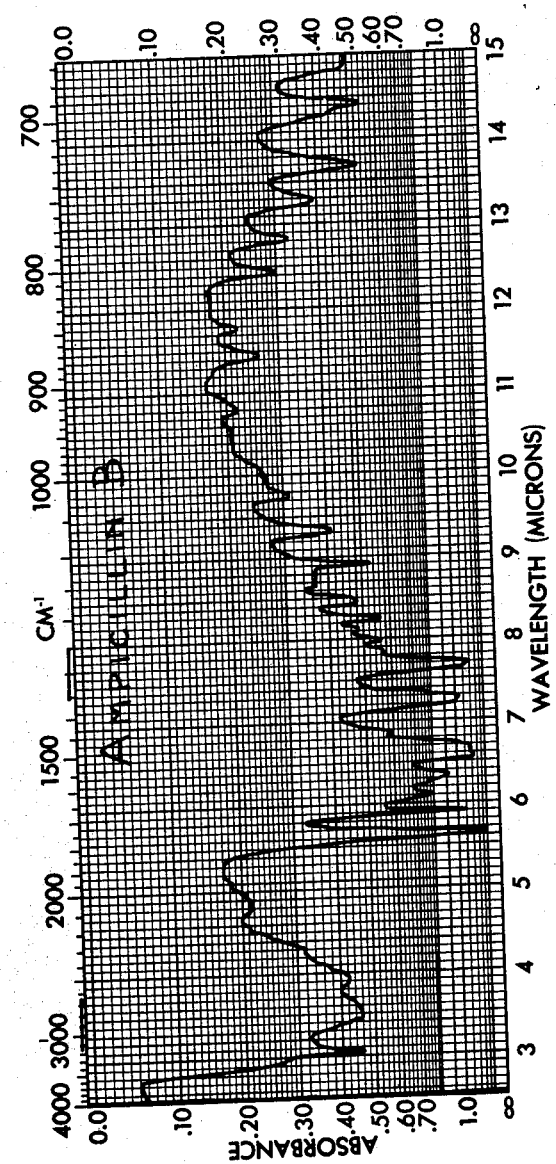

Aug. 11, 1964  N. H. GRANT ETAL  3,144,445
CRYSTALLINE FORM OF D-6-(2-AMINO-2-PHENYL-ACETAMIDO)
PENICILLANIC ACID
Filed Dec. 26, 1962  2 Sheets-Sheet 2

INVENTORS
N.H. GRANT AND H.E. ALBURN
BY
Andrew Kaflor
ATTORNEY

United States Patent Office 3,144,445
Patented Aug. 11, 1964

3,144,445
CRYSTALLINE FORM OF D-6-(2-AMINO-2-PHEN-YL-ACETAMIDO) PENICILLANIC ACID
Norman H. Grant, Wynnewood, and Harvey E. Alburn, West Chester, Pa., assignors to American Home Products Corporation, New York, N.Y., a corporation of Delaware
Filed Dec. 26, 1962, Ser. No. 247,394
2 Claims. (Cl. 260—239.1)

This invention relates generally to the production of derivatives of penicillanic acids and more particularly to a novel form of D-6-(2-amino-2-phenyl-acetamido) penicillanic acid and a method of preparing such form.

One form of D-6-(2-amino-2-phenyl-acetamido) penicillanic acid is already known to the art from U.S. Patent 2,985,648, in which a comparatively complex method for the preparation thereof is disclosed. A simpler and more economic method for the production of the previously known D-6-(2-amino-2-phenyl-acetamido) penicillanic acid now referred to in the art by the shorter name "ampicillin" is disclosed and claimed in copending U.S. application Serial No. 175,828 of H. E. Alburn, N. G. Grant and H. Fletcher, filed February 26, 1962, and assigned to the assignee of the present application.

The previously known form of D-6-(2-amino-2-phenyl-acetamido) penicillanic acid, hereinafter referred to as "ampicillin A," is now of proven value in its broad spectrum antibacterial activity and is useful as a therapeutical agent in poultry and in mammals, and particularly in man, in the treatment of infectious diseases caused by gram-positive and gram-negative bacteria, upon parenteral or oral administration. It also has use as a nutritional supplement in animal feed. The similarly known form, L-6-(2-amino-2-phenyl-acetamido) penicillanic acid, has been found to be of appreciably less value for the aforesaid purposes because of its inherently lesser antibiotic activity.

As disclosed in said U.S. Patent 2,985,648, ampicillin A may be prepared by a method generally comprising the reaction of 6-amino penicillanic acid with the α-amino-benzyl acid chloride or anhydride in which the amino group has previously been provided with a protecting acyl group, such as $PhCH_2OCO-$, or some other functionally equivalent protecting group. To recover the desired ampicillin A, it is then necessary to remove the protecting group by catalytic hydrogenation under sufficiently mild conditions to avoid destruction of the penicillin nucleus. In accordance with the teachings in said patent, the less active L-6-(2-amino-2-phenyl-acetamido) penicillanic acid is prepared in similar manner.

With respect to the mild conditions stated to be necessary for the method, the patent warns that since some of the antibiotic substances obtained by the process disclosed therein are relatively unstable compounds which readily undergo chemical changes resulting in the loss of antibiotic activity, it is desirable to choose the reaction conditions which are sufficiently moderate to avoid their decomposition. In this connection, it is further stated in the patent that the temperature chosen for the process of preparation of the derivatives of penicillanic acid should not exceed 30° C., and that in many cases a suitable temperature is ambient temperature. Further in this connection, each of the examples disclosed in the patent states the conditions under which recovery of the desired product is obtained is by evaporation in vacuum at a temperature below 20° C. with the exception that D-6-(2-amino-2-phenyl-acetamido) penicillanic acid monohydrate, ampicillin A, may be obtained by evaporation in vacuum at a temperature of 32° C.

In the process of the invention disclosed in said copending application Serial No. 175,828, a 4-substituted-2,5-oxazolidinedione (also known as an N-carboxyamino acid anhydride) is reacted with 6-aminopenicillanic acid. It is there disclosed that the reaction should take place in a cold aqueous solution which is stirred for several hours at a temperature from just above the freezing point of the aqueous mixture to about 37° C., and preferably in the range 0–10° C. The examples in said application disclose the reaction as taking place at temperatures in the region of 0° C. and no higher than 2° C.

Ampicillin A prepared by the foregoing procedures and all other procedures as far as known contain from 2.5% to 10% water as determined by the Karl Fischer method. This further indicates that ampicillin A as prepared heretofore has been in the form of the hemihydrate or the monohydrate as referred to in U.S. Patent 2,995,648, and possibly also as dihydrate.

Figure 2:
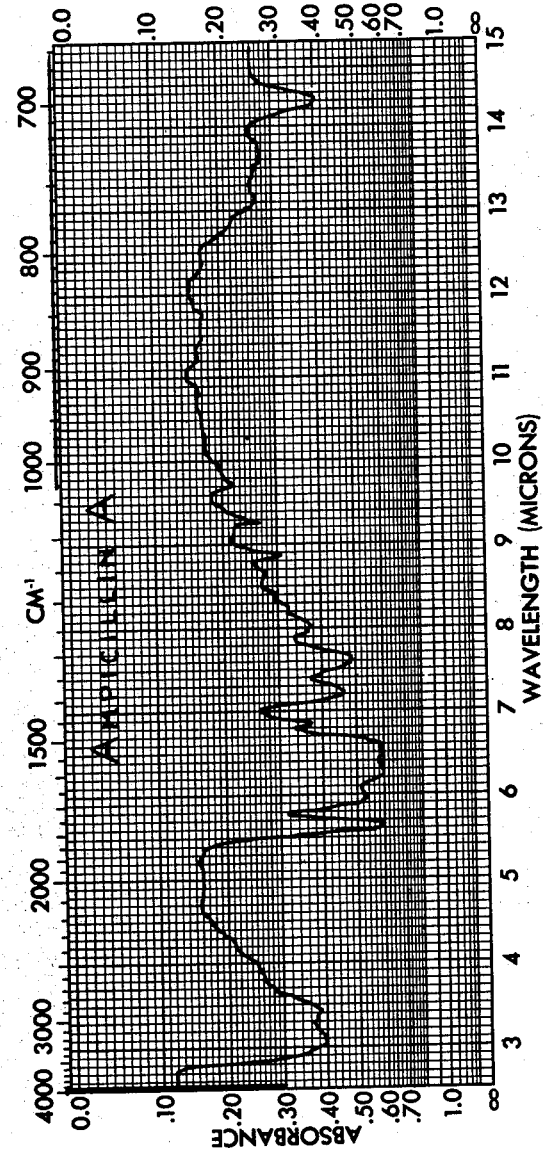

We have now made the surprising discovery that ampicillin, i.e., D-6-(2-amino-2-phenyl-acetamido) penicillanic acid, may be prepared in a previously unknown anhydrous form designated hereinafter as "ampicillin B." This new compound is characterized by the fact that it has very little, if any, water, up to no more than 2.5%. It is much less soluble in either water or dimethylsulfoxide than is ampicillin A. The differing crystal structure of the ampicillin B form is demonstrated by its spectrograph, an example of which is shown in FIG. 1 of the drawings, when compared with the spectrograph of ampicillin A, an example of which is shown in FIG. 2. Moreover, X-ray diffraction analyses of single crystals of ampicillin B have indicated a molecular weight of 346±3 (the theoretical molecular weight of the monomeric anhydrous compound being 349), as compared with the molecular weight of samples of ampicillin A of 367 (precisely the theoretical weight of the monohydrate) determined by osmometrical analyses.

The ampicillin B compound is further distinguished in that, due to its lesser solubility, it is of greater stability on storage than is ampicillin A. Because of this stability, coupled with its denseness, the efficiency of production of the compound in capsule dosage form is increased. As a further advantage that is linked to its lesser solubility in water, ampicillin B exhibits slower absorption in the gut and hence provides prolonged blood levels and more effective action against intestinal pathogens. The foregoing differences and advantages of ampicillin B over ampicillin A are of enhanced significance, since to utilize them, therapeutic effectiveness is not at all sacrificed. On the contrary, effectiveness of ampicillin B is substantially equal to that of ampicillin A on a weight-for-weight basis. For example, when mice were challenged intraperitoneally with a penicillin sensitive strain of S. aureus and a virulent strain of S. typhosa and both types of ampicillin were administered by the oral route to the separately infected mice, equal protection was afforded by each drug.

Ampicillin B has been demonstrated experimentally to have very little affinity for water. For example, one gram suspended in 10 ml. of water at 0° C. for 3 days dissolved only to about 20%, and the remaining 80% was easily dried to 0.67% H₂O and retained the ampicillin B infra red spectrum. This appears to suggest a reason why ampicillin B is so much more stable on storage than is ampicillin A, since water seems to be an important factor in reducing the stability of ampicillin.

After actual hydration, ampicillin B appears to change back to ampicillin A as has been indicated by the infra red spectrum, paper and thin layer chromatography, and paper electrophoresis. It has not yet been possible to convert the solid form of ampicillin A to ampicillin B using a variety of drying techniques.

To demonstrate the stability in the solid state of ampicillin B as compared with ampicillin A, a series of samples was subjected to varying conditions as given below in Table A. The assays were for β-lactam based on the hydroxamate assay to indicate percent loss tabulated below:

TABLE A

| Conditions | Time | Percent loss | |
|---|---|---|---|
| | | A | B |
| 50° C. | 10 days | 19 | 0 |
| 70° C. | 65 hrs | 39 | 0 |
| 70° C. | 160 hrs | 61 | 0 |
| 107° C. | 18 hrs | 66 | 2 |
| 107° C. | 90 hrs | 79 | 1 |
| 107° C. | 166 hrs | 94 | 3 |
| 70° C., 100% humidity | 18 hrs | 69 | 2 |
| 120° C., 100% humidity (Autoclaved) | 15 mins | 40 | 6 |

Generally, the method for preparing the novel compound ampicillin B comprises heating ampicillin A in the presence of free water at a temperature of from 40° to about 100° C., until ampicillin B is formed. The heating may best be carried out with the charge of ampicillin A plus water at a pH of from about 3.0 to 7.0. Preferably the free water is present in amount that is at least 50% by weight of the charge, and the heating is applied to the charge under vacuum until the dry ampicillin B product is obtained. In an alternative procedure, the required heating conditions may be applied to an aqueous reaction mixture comprising the reactants which normally result in formation of ampicillin A. In another procedure, the required heat and water may be supplied by directly steaming crystals of ampicillin A. It has been found most advantageous from the standpoint of feasibility and of economic processing to carry on the drying operation at a pH of from 5.0 to 5.5 and at a temperature within the range of 50°–55° C.

The presence of free water in the charge of ampicillin A to be transformed into ampicillin B, and the minimum heating temperature of 40° C. to effect the transformation, have both been demonstrated to be essential to the method of the invention. In this connection, it has been proven that drying alone will not cause the desired transformation. Several lines of evidence were followed in such proof. Thus, it was found exceedingly difficult to lower the water content of previously dried ampicillin A below 2% by a variety of procedures, including Abderhalden drying at 55° C. with P₂O₅, azeotropic distillation with benzene, reaction with 2,2-dimethoxypropane and acid, the vacuum oven over P₂O₅ at 55° C., and treatment of dimethylformamide solution with Linde "molecular sieve" followed by dry ether crystallization. In all cases, the end products were still ampicillin A. On the other hand, water or dilute acid extraction of ampicillin B gave an insoluble component (78% of the total at pH 4 and 20% at pH 2 in 10% suspensions) which remained ampicillin B even when mildly dried in vacuo at room temperature over P₂O₅. The foregoing is a further indication that one difference in kind between ampicillin A and ampicillin B is due to the process of crystal formation.

As already referred to, ampicillin B is less soluble in water and in dimethylsulfoxide. For example, the ratio of solubility in water is about 4:7. However, once ampicillin B is dissolved into water, it is then apparently identical to ampicillin A and can be made to crystallize as ampicillin A by the lower temperature, lesser water content crystallization procedures known heretofore. No evidence has been found that ampicillin B changes to ampicillin A in the solid state. Further, ampicillin B is readily converted to form ampicillin A by dissolving in water at any pH and crystallizing below 40° C. or freeze-drying. On the other hand, of course, conversion of ampicillin A to ampicillin B requires heat and presence of water. The reaction is influenced by the period of heating, water content and pH as will appear in greater detail hereinafter.

The following examples are illustrative of the invention, but are not to be considered necessarily limitative thereof:

*Example I*

Mix 120 grams of 6-aminopenicillanic acid with 15 liters of cold water, 27.6 ml. of 8.5 N KOH, and 49.5 grams of D-phenylglycine-N-carboxyanhydride. Stir for 1 hour at 2° C. Filter, and concentrate the filtrate (pH 5.2) to 2.9 liters. Remove the precipitate, and pass the filtrate through a 3.2 x 55 cm. Dowex 1- x 10 column (acetate form, 50–100 mesh). Concentrate the effluent (3.14 liters) to 275 ml. at 50–55° C. and dry the insoluble product in vacuo to obtain a product weighing 41 grams and containing 1% water. Subject the product to infrared analysis to show the spectrograph of ampicillin B.

*Example II*

Dissolve a sample of substantially pure commercially obtainable ampicillin A in water at pH 2.0 to form a 10% solution. Adjust the solution to pH 3.0 and then heat to 65° C. At this temperature, adjust the pH with dilute sodium hydroxide solution to approximately 4.8 to cause rapid formation of granular crystals. Filter off the crystals and then dry. Take separate infra red spectra of the dried product and of the starting material to result in respective spectrographs for each as shown in FIG. 1 and FIG. 2 respectively.

In connection with the considerably different infra red spectrum found for ampicillin B, the importance of such difference as an indication of the differences in spectrum between ampicillin B and ampicillin A appears in the Chemistry of Penicillin, H. W. Thompson et al., Princeton University Press, Princeton, New Jersey, 1949, wherein it is stated at page 383 as follows:

"Absorption bands in the 2–25μ region arise from the excitation of molecular vibrations, the fundamentals, overtones, or combinations being taken up. A molecule as complex as penicillin has many possible vibrational modes and the spectrum is accordingly highly complex. In principle, however, this spectrum remains a unique property of the molecule, and for this reason, the identity of the infrared spectra of natural and synthetic samples may, if studied under high resolution, be the best proof of structure available."

*Example III*

Warm each sample of a series of 10% suspensions or solutions of commercially obtainable ampicillin A at pH 2.0, 3.0, 4.8 and 7.0 for 10 minutes at the temperatures set forth in Table B below. Adjust each to pH 4.8 and warm each at the same given temperature for 5 minutes, filter rapidly, dry at room temperature and subject the insoluble fraction to infrared analysis of crystal form to obtain the results set forth in said Table B below:

TABLE B

| pH | 25° | 30° | 35° | 40° | 45° | 50° | 55° | 70° | 81° |
|---|---|---|---|---|---|---|---|---|---|
| 2.0 | | | | | No ppt. | No ppt. | B | No ppt. | A decomp. |
| 3.0 | A | A | A | B | B | B | B | B–A | B |
| 4.8 | A | A | | A | A–B | B | B | B | A decomp. |
| 7.0 | | | A | A | B | B | B | B | A decomp. |

Example IV

When 10% suspensions were warmed at 55°, pH 4.8 (isoelectric region) for various periods, the changed rate of solubiliation of ampicillin B, as well as the time dependence of the conversion, became apparent, as shown in the following tabulation:

TABLE C

| Warming period, minutes | Insoluble Fraction, Percent | Crystal Type |
|---|---|---|
| 2 | 14 | A-B |
| 4 | 31 | B |
| 6 | 36 | B |
| 8 | 37 | B |
| 15 | 44 | B |
| 30 | 50 | B |
| 60 | 44 | B |
| 120 | 44 | B |
| 180 | 42 | B |

Example V

Prepare separate 10% and 20% suspensions of ampicillin A and warm both at 50° C., then, without filtering, pour into Petri dishes and dry overnight at 52° C. and 100° C., respectively, to obtain ampicillin B in each dish in evidence that ampicillin A may be converted quantitatively to ampicillin B.

Example VI

Introduce one ml. of a 50% suspension of ampicillin A crystals into a series of five beakers each having an 8 cm.² floor. Dry each suspension through a heating range starting at 40° C. and increasing the temperature in 3° C. increments after respective periods of 2¼, 1⅔, 1, 1, and 1 hours while testing the product in one beaker after each interval to achieve a maximum temperature of 55° C. in the last remaining beaker. The product in each beaker is ampicillin A.

In an identical container, dry 2 ml. of a 25% suspension of ampicillin A (75% water) for 2 hours at 55° C. to form ampicillin B.

The foregoing demonstrates that both sufficient water and time of heating are necessary to formation of ampicillin B.

Example VII

A group of healthy dogs were given orally equivalent doses by weight of ampicillin A and ampicillin B and serum concentration determinations with respect to each dog were made over a period of six hours. The data with respect to these experiments is given below in Table D:

TABLE D

| | 50 mg./kg. dose for each | | | | | |
|---|---|---|---|---|---|---|
| | Amplicillin A | | | Amplicillin B | | |
| Dog Identification | W | X | Av. | Y | Z | Av. |
| Dog Wt. (kg.) | 12.6 | 13.0 | | 12.4 | 11.1 | |
| Hours: | | | | | | |
| 0 | 0 | 0 | | 0 | 0 | |
| 1 | 2.15 | 1.70 | 1.93 | 1.58 | 7.65 | 4.62 |
| 2 | 5.40 | 6.80 | 6.10 | 3.88 | 8.92 | 6.40 |
| 3 | 3.40 | 3.50 | 3.45 | 4.62 | 5.38 | 5.00 |
| 4 | 1.85 | 1.50 | 1.68 | 2.41 | 2.92 | 2.67 |
| 6 | 0.632 | 0.30 | 0.47 | 0.53 | 0.675 | 0.60 |

The foregoing demonstrated the sustained high blood level concentrations obtainable with the use of ampicillin B when compared to equivalent use of ampicillin A.

Example VIII

Prepare unit dosage forms containing suitable amounts of ampicillin B with the use of known compounding procedures for use of such forms in human therapy by oral ingestion from the following formulations in Tables E and F:

TABLE E

Tablet formula: | Mg.
---|---
Crystalline ampicillin B | 250.0
Calcium carbonate, heavy | 150.0
Cab-O-Sil M-5 | 5.0
Sodium citrate, anhydrous | 20.0
Magnesium stearate | 7.5
Amberlite XE-88 | 5.0
Microcel C | 90.0
Total wt. | 527.5

TABLE F

Capsule formulation: | Mg.
---|---
Crystalline ampicillin B | 250.0
Cab-O-Sil M-5 | 15.0
Magnesium stearate, U.S.P. | 20.0
Lactose, U.S.P. | 250.0
Total wt. | 535.0

Alternatively, prepare capsules from the formulation given in Table F above.

Use the unit dosage forms for treating gram-negative or gram-positive infections in humans. Administer the forms orally and in a daily regimen of from 500 mg. to 10 gm. depending upon therapeutic requirements. For example, the 10 gm. dosage may be administered to a known typhoid carrier. Preferably, to treat gram-negative infections, administer from 4–6 unit dosage forms daily, and to treat gram-positive infections, administer from 2–4 unit dosage forms daily for sustained high blood level concentrations of the antibiotic.

We claim:

1. A new crystalline form of D-6-(2-amino-2-phenylacetamido) penicillanic acid characterized by being substantially free of water in the chemically bound state, having a molecular weight of about 349, having an infrared spectrograph as disclosed in FIG. 1 of the drawings, and possessing substantially greater storage stability than hydrated crystalline D-6-(2-amino-2-phenyl-acetamido) penicillanic acid.

2. The method of preparing the new substantially anhydrous crystalline form of D-6-(2-amino-2-phenyl-acetamido) penicillanic acid, which method comprises: preparing an aqueous mixture comprising D-6-(2-amino-2-phenyl-acetamido) penicillanic acid in at least about 50% by weight of free water at a pH of from about 3.0 to 7.0; heating said mixture to a temperature of from 40° C. to about 100° C.; and drying the mixture to obtain the crystals of the substantially anhydrous form of D-6-(2-amino-2-phenyl-acetamido) penicillanic acid.

References Cited in the file of this patent

UNITED STATES PATENTS 2,985,648    Doyle et al.    May 23, 1961